United States Patent [19]

Bright et al.

[11] 4,304,816
[45] Dec. 8, 1981

[54] CHANNEL-SHAPED STRIP STRUCTURES

[75] Inventors: Robert G. Bright, Viersen; Helmut Theisen, Munchengladbach, both of Fed. Rep. of Germany

[73] Assignee: Draftex Development AG, England

[21] Appl. No.: 83,154

[22] Filed: Oct. 9, 1979

[30] Foreign Application Priority Data

Oct. 14, 1979 [GB] United Kingdom ............. 40601/78

[51] Int. Cl.³ ...................... B32B 15/08; E06B 7/16; E04F 19/02
[52] U.S. Cl. ..................................... 428/358; 49/490; 49/491; 52/716
[58] Field of Search ................. 428/358, 122; 49/490, 49/491; 52/716, 717, 718

[56] References Cited

U.S. PATENT DOCUMENTS

| | | | |
|---|---|---|---|
| 2,290,842 | 7/1942 | Bush | 428/122 X |
| 2,549,581 | 4/1951 | Dodge | 428/122 |
| 3,091,821 | 6/1963 | Cook, Jr. | 428/122 X |
| 3,136,676 | 6/1964 | Fisch | 264/171 X |
| 3,310,928 | 3/1967 | Weimar | 52/716 |
| 3,706,628 | 12/1972 | Azzola | 428/122 X |
| 3,993,819 | 11/1976 | Fewkes | 428/358 X |
| 4,010,573 | 3/1977 | Andrzejewski | 52/716 X |
| 4,042,741 | 8/1977 | Bright | 428/358 X |
| 4,148,961 | 4/1979 | Paulus et al. | 428/358 |

*Primary Examiner*—Lorraine T. Kendell
*Attorney, Agent, or Firm*—Leydig, Voit, Osann, Mayer & Holt, Ltd.

[57] ABSTRACT

Channel-shaped strip structures are disclosed for use, for example, in vehicle body construction, such as for fitting onto door surround flanges or for use for mounting or sealing window glass. The strip structure comprises a channel-form metal carrier embedded in extruded or plastics or rubber material. The design of the metal carrier may be such as to resist lengthwise compression of the strip. In addition, the carrier has secured to it and running along one surface, and under the extruded plastics or rubber material, a flexible substantially inextensible member, such as polyester tape, which substantially prevents stretching of the strip.

4 Claims, 7 Drawing Figures

CHANNEL-SHAPED STRIP STRUCTURES

BACKGROUND OF THE INVENTION

The invention relates to reinforcements for strip structures and more specifically, though not exclusively, to reinforcements for channel-shaped strips such as for sealing, finishing, and guiding purposes and to such strip structures and channel-shaped strips. Such strips may, for example, be used for finishing or sealing the flanges around openings in vehicle bodies or the like, or for supporting, sealing or guiding the edges of window glass.

In use, such strips may be supplied to the vehicle body manufacturer already cut into lengths suited to particular door openings. Such lengths may be joined on themselves to provide a completely closed loop. In either case, it will be appreciated that it is very important that the strip should maintain a substantially constant length once its manufacturing process has been completed. If it undergoes changes in length, then it may be found to be of incorrect length when it comes to be fitted to the vehicle body. If it changes its length after having been fitted to the vehicle body, for example if it shrinks, it will tend to be pulled off the edge flange at corners or bends in the flange and provide an unsightly appearance and ineffective weather seal. Various factors can tend to change the length of the strip. For example, the strip may be subjected to tension while it is being fitted to the edge flange. It will also be subjected to tension during its manufacturing process, and if this causes stretching, then it may shrink by subsequent resiling. Temperature changes may also tend to change its length. Such temperature changes may merely be ambient temperature changes. In addition, however, the sealing strip may be subjected to quite substantial changes in temperature in the case where the vehicle body to which it is fitted is passed through a paint-drying oven.

An object of the invention is to provide an improved reinforcement for a strip structure.

Another object of the invention is to provide an improved channel-shaped strip structure.

BRIEF SUMMARY OF THE INVENTION

According to the invention, there is provided a reinforcement for a strip structure, comprising a carrier made of strip form elements and at least one flexible substantially inextensible member running along the length of the structure and secured directly or indirectly to the elements so as to resist any tendency of the carrier to stretch.

According to the invention, there is also provided a channel-shaped strip structure, comprising a channel-shaped carrier made of strip form elements and at least partially embedded in flexible covering material, and at least one flexible substantially inextensible member running along the length of the strip and covered by the flexible material so as to resist any tendency of the strip to stretch.

DESCRIPTION OF THE DRAWINGS

Reinforcements embodying the invention and channel-shaped strip structures embodying the invention will now be described, by way of example only, with reference to the accompanying drawings in which.

DESCRIPTION OF PREFERRED EMBODIMENTS

Figure 5:
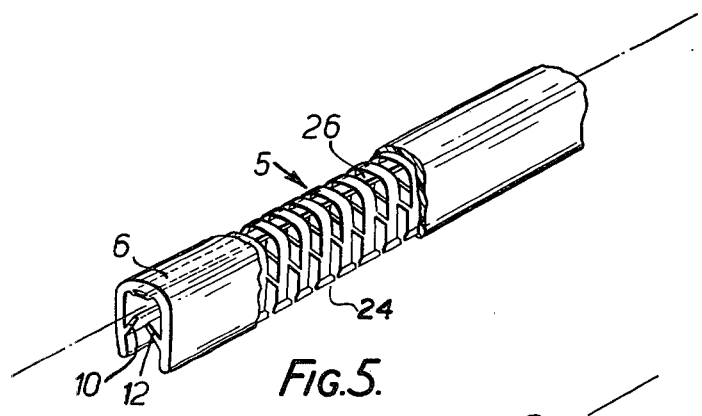
FIG. 5 is a perspective view of a strip produced from from the structure shown in FIG. 4 at the completion of the manufacturing process.
Figure 6:
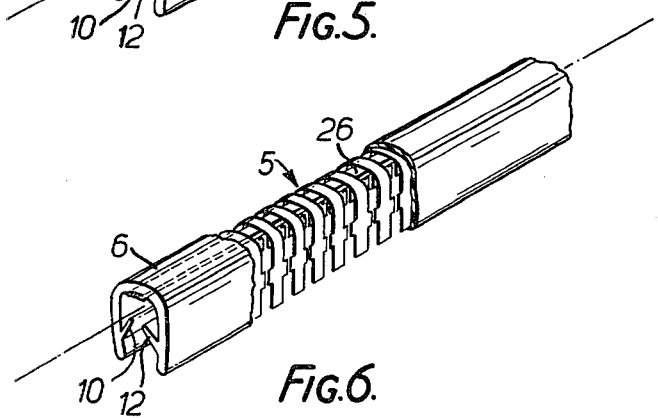
FIG. 6 is a view corresponding to FIG. 5 but showing a strip incorporating the carrier of FIG. 3.

The channel-shaped strip structures to be more specifically described have, in their finished form, a metal carrier 5 (see FIGS. 5 and 6) embedded in plastics or rubber or similar covering material 6. As shown in FIGS. 5 and 6, the covering material 6 on the inside of the channel is arranged to define gripping ribs 10 and 12 which run along the facing side walls of the channel. In use, the strip may be placed over a flange running around the opening in a vehicle body, such as a door opening for example, and, when in such position, provides weather and draught-proofing as well as covering and protecting the edge of the flange. In addition, the sealing strip may support a longitudinal beading (not shown), preferably of soft material such as sponge rubber, against which a door (for closing the opening) shuts, and this beading provides further draught proofing and a weather seal.

The gripping ribs 10 and 12 help to prevent inadvertent removal of the strip from the flange and also improve the weather sealing properties of the strip. If desired, the gripping rib may be omitted from one or each side of the channel or there may be more than one gripping rib on one or each side (possibly with unequal numbers of gripping ribs on opposite sides such as, for example, a single large rib on one side and several smaller ribs on the other side).

The metal carrier 5 supports the covering material 6 and gives strength and resilience to the finished sealing strip so as to ensure that it has a firm grip on the edge flange. At the same time, however, the carrier must be sufficiently flexible to enable the strip to be relatively easily bent in all directions about its longitudinal axis so as to follow curves in the edge flange to which it is to be fitted.

In use, the strip may be supplied to the vehicle body manufacturer already cut into lengths suited to particular door openings. Such lengths may be joined on themselves to provide a completely closed loop. In either case, it will be appreciated that it is very important that the sealing strip should maintain a substantially constant length once its manufacturing process has been completed. If it undergoes changes in length, then it may be found to be of incorrect length when it comes to be fitted to the vehicle body. If it changes its length after having been fitted to the vehicle body, for example if its shrinks, it will tend to be pulled off the edge flange at corners or bends in the flange and provide an unsightly appearance and ineffective weather seal. Various factors can tend to change the length of the sealing strip. For example, the strip may be subjected to tension while it is being fitted to the edge flange. It will also be subjected to tension during its manufacturing process, and if this causes stretching, then it may shrink by subsequent resiling. Temperature changes may also tend to change its length. Such temperature changes may merely be ambient temperature changes. In addition, however, the sealing strip may be subjected to quite substantial changes in temperature in the case where the vehicle body to which it is fitted is passed through a paint-drying oven.

Figure 1:
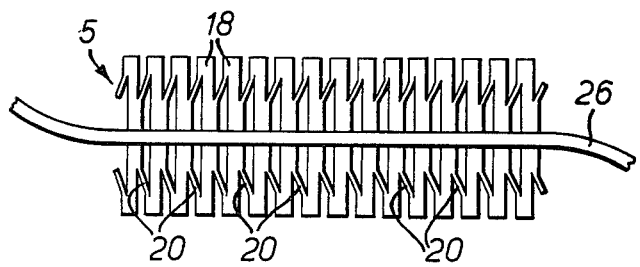
FIG. 1 is a plan view of one form of a metal reinforcing carrier for the strip at an early stage in manufacture of the strip.

FIG. 1 shows one form which the metal carrier 5 can take at an initial stage in the manufacturing process. The carrier is formed out of longitudinal strip metal. At the stage shown in FIG. 1, the strip metal has been formed so as to provide a plurality of side-by-side elements 18 extending across the width of the blank which are connected together by short integral connecting links 20 which are inclined with respect to the elements 18. Such a structure may be manufactured by any convenient way, such as by cutting slots through the blank by means of a suitable punch. Instead of slots, slits could be cut at appropriate places, and the slits converted into slots by longitudinally stretching the blank—as by rolling the blank along a narrow region extending longitudinally of the blank so as to thin it down in this region and thus to increase its length; this method has the advantage that there is less wastage of material.

Figure 2:
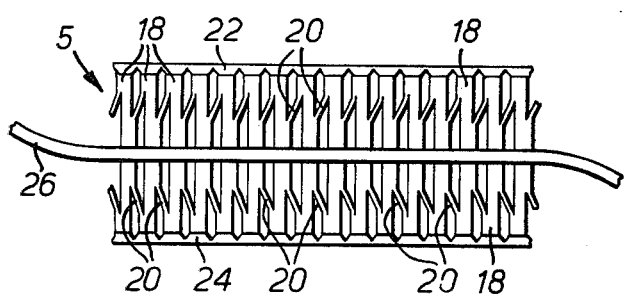
FIG. 2 is a view corresponding to FIG. 1 but showing a slightly different form of metal carrier.

The structure shown in FIG. 2 differs from the carrier shown in FIG. 1 only in that the elements 18 are connected not only by the connecting links 20 but also by marginal regions 22, 24. These marginal regions may be regions along which the metal blank (from which the carrier is formed) is, after slitting, subjected to a thinning-down process as by rolling, so as to expand the slits into slots.

Figure 3:
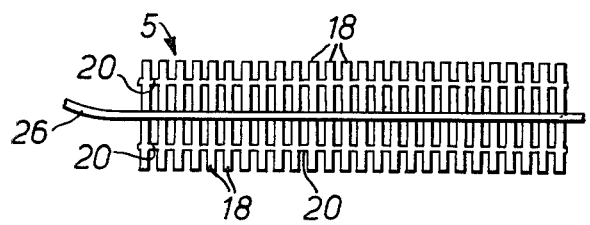
FIG. 3 is a view corresponding to FIG. 1 but showing another form of metal carrier.

FIG. 3 shows another form which the carrier can take (at an early stage in its manufacture). In this case, it comprises elements 18 joined by integral, straight connecting links.

In addition, the structures of FIGS. 1, 2 and 3 have, associated with them, respective flexible substantially inextensible members 26. Each member 26 may be made of any suitable material, such as synthetic material. For example, the member 26 may comprise glass fibre strands. Such strands could, for example, be adhesively secured to polyester material so as to produce a tape, about 5 mm wide for example. This tape could then be adhesively secured to the elements 18.

In another example, the member 26 comprises polyester threads (five in number, for example) woven together to form a lattice-like tape about 3 mm wide, for example. Again, such a tape may be adhesively secured to the elements 18 though not necessarily so as will be explained in more detail below.

Figure 4:
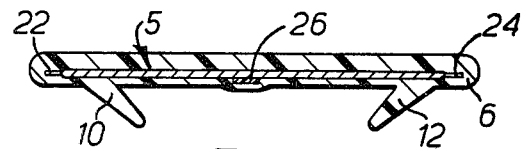
FIG. 4 is a cross-section on the line IV—IV of FIG. 2 but showing the carrier of that Figure after an extrusion process.

The next stage in the manufacturing process comprises the feeding of the carrier 5 (usually in its flat form as shown in FIGS. 1, 2 and 3), together with the member 26 thereon, into an extruder which applies a coating of the covering material 6. After emerging from the extruder, the structure has the form shown in FIG. 4 (this Figure in fact refers to the structure of FIG. 2 but at the same stage in the manufacturing process, the structures of FIGS. 1 and 3 would have corresponding shapes). The covering material 6 thus covers the metal carrier and the member 26 and defines the gripping ribs 10 and 12.

As stated above, the member 26 may be adhesively secured to the metal elements 18. Instead, however, it can simply be laid onto the metal elements 18 of the carrier 5 so that it passes into the extruder with the carrier. The extruded material covers the carrier and the member 26 and holds the member in position; it is not otherwise connected to the carrier. In such a case, it is advantageous for the member 26 to be coated with a bonding agent which promotes bonding of the member 26 to the extruded material. The bonding agent may be activated by the heat of the extruded material during the extrusion process. The avoidance of adhesive may be advantageous because the use of adhesive to secure the member 26 in position may undesirably increase the effective thickness of the member. In addition, it may possibly cause the material of the member 26 to become brittle. Furthermore, if the member 26 has a lattice-like form, this is advantageous in that it allows the extruded covering material 6 to bond through the holes in the lattice, and the use of adhesive may clog the holes and prevent this process.

However, in some applications it is advantageous for the member 26 to be adhesively secured to the carrier. For example, when the covering material 6 to be applied to the carrier is rubber, as opposed to plastics, it may be necessary or advantageous to bend the metal carrier into U-form before, rather than after, passing it into the extruder. This is because the bending step, if it takes place after the extrusion step, will inevitably involve the bending of the rubber covering 6 on the carrier and this will strain and stretch the rubber, giving rise to the possibility of cracking. It is therefore advantageous to bend the carrier before the extrusion process. However, in such an application, it would be difficult to lead the member 26 into the extruder together with but separate from the carrier (because of the latter's channel-shape at this stage), and it is simpler to have it secured to the metal carrier already.

After the extrusion process, the structure is then bent into channel form as shown in FIG. 5 for the carrier of the type shown in FIG. 2 and as shown in FIG. 6 for the carrier of the type shown in FIG. 3; in FIGS. 5 and 6, part of the covering material 6 is broken away to show the carrier 5 and the member 26.

In the case of the carrier of the form shown in FIG. 2, after the extrusion process (for example while bending the covered blank into channel form) the marginal regions 22, 24 fracture as shown in FIG. 5 but the links 20 remain integral. In the case of the carrier of the form shown in FIG. 3, however, the links may be arranged to break (as shown in FIG. 6). The structure shown in FIGS. 2 and 5 has the advantage that the marginal regions 22, 24 provide added strength for the carrier to withstand tension forces which may be applied to it during manufacture, but are afterwards fractured, as described, so as not to impede the flexibility of the carrier in the finished sealing strip.

In the finished sealing strip, the member 26 is primarily for resisting stretching. Whether the member 26 is adhesively secured to the metal elements 18, or whether it is not directly secured to the metal elements but is locked into the extruded material 6, it is in effect locked within the strip. Tension applied to the strip is applied to, and therefore resisted by, the substantially inextensible member 26, but of course the member 26 does not impede the flexibility of the finished sealing strip.

The strips described are also more resistant to shrinkage. In the case of the strip of FIG. 5, the connecting links 20 resist forces tending to shrink the strip longitudinally. In the case of the strip of FIG. 6, the presence of the member 26 indirectly helps to prevent shrinkage because it prevents stretching taking place during manufacture which would give rise to subsequent shrinkage when the strip resiled afterwards over a period of time; and this of course applies also to the strip of FIG. 6.

It is not necessary for the member 26 to be positioned to run along the longitudinal axis of symmetry of the carrier. It may be positioned elsewhere, and there may be two or more members 26 if desired. It may be advantageous to arrange for the member 26 to run along the length of the strip at a position slightly off its axis of symmetry; when the strip is bent into channel form, there may be a tendency for the member 26 to bend over on itself to some extent and this may cause a small hump running along the length of the covering material 6 on the inside of the base of the channel. It may be disadvantageous for this "hump" to be positioned along the centre of the inside of the base of the channel because it may impede the proper seating of the strip on the mounting flange in use. If the member 26 is offset in this way, then it is preferably offset towards the side of the channel having the larger rib 10, 12 if the ribs are not similar on both sides.

Figure 7:
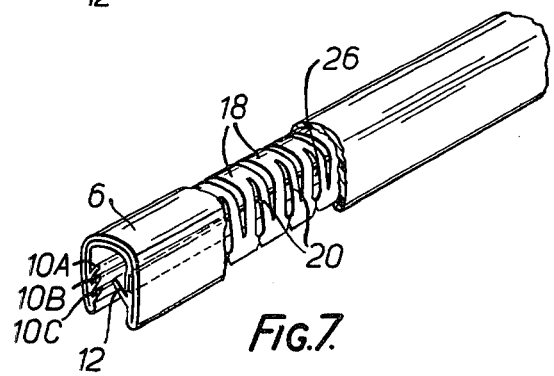
FIG. 7 is a view corresponding to FIG. 5 but showing modifications.

FIG. 7 shows a modified form of the strip of FIG. 5 in which the shapes and orientations of the elements 18 and the connecting links 20 are slightly different. In addition, the strip of FIG. 7 has a single relatively large gripping rib 12 on one of its inside walls and three smaller gripping ribs 10A, 10B, 10C on its opposite inside wall. The tape 26 in this case does not run along the base of the channel but along one inside wall of the channel behind the gripping rib 12. This position for the tape may have manufacturing and operational advantages.

In order to reduce the possibility of the member 26 from being cut or otherwise damaged by any sharp edges that there may be on the elements 18, it may be advantageous to subject the metal strip to a planishing step after it has been slotted or slit and rolled, as explained above. Such a planishing step removes the sharp edges. It is also advantageous, as illustrated above, for the member 26 to be positioned so as to run along the inside of the channel in the finished strip, as opposed to the outside of the channel. It is found that in such a way there is less tendency for the edges of the elements 18 to cut into the member 26 and (in the case where the member 26 is merely laid on and not adhesively secured to the elements 18) it is easier with such an arrangement for the extruded material to form a thin layer between the member 26 and the metal, and this further resists cutting or damaging of the member 26 by the sharp edges of the elements 18.

The members or members 26 may be used with other forms of carrier, for example carriers made of looped wire. In such a case, for example, two members 26 could be used, and arranged to run together along the length of the carrier but respectively on the inside and outside of the channel shape so as to be adhesively secured together through the interstices of the wire.

Although the foregoing description is with reference to the use of the strips for fitting onto flanges and the like, the strips may instead be used as window glass guide channels. Again, the member 26 will help to resist tension forces and the carrier 6 will tend to resist compression forces. In such application, the gripping ribs 10, 12 may be removed or modified so as to facilitate entry of the window glass.

The member 26 may, however, also be used with metal reinforcements in completely different types of strip structures, such as, for example, conduits for electrical cables.

What is claimed is:

1. A channel-shaped strip structure, comprising:
    a channel-shaped metal carrier, in the form of a series of side-by-side U-shaped metal strip elements defining a channel, each element being connected to the corresponding adjacent element by means of an integral connecting link, and each element terminating in a thinned-down portion which extends at least partway to a corresponding portion terminating the ends of the adjacent elements,
    flexible covering material completely embedding the carrier, the flexible covering material being shaped to define gripping ribs running along the length of and within the channel shape of the strip structure and extending inwardly of the channel shape from the opposite inside walls thereof, there being one relatively large gripping rib on one said inside side wall and at least one relatively smaller gripping rib on the opposite inside side wall, and
    at least one flexible substantially inextensible tape-like member made of synthetic material running along the length of the strip and covered by the flexible covering material so as to resist any tendency of the strip structure to stretch, the tape-like member being free to move, with the flexible covering material, relative to the carrier elements,
    the said tape member positioned along the said one inside side wall adjacent to the relatively large gripping rib thereon.

2. A structure according to claim 1, in which the synthetic material is polyester.

3. A structure according to claim 1, in which the synthetic material is glass fibre.

4. A structure according to claim 1, in which the member is covered with bonding material which bonds it to the flexible covering material.

* * * * *